US007962423B2

(12) United States Patent
Ryan, Jr.

(10) Patent No.: US 7,962,423 B2
(45) **Date of Patent: *Jun. 14, 2011**

(54) METHOD AND SYSTEM FOR DISPENSING VIRTUAL STAMPS

(75) Inventor: Frederick W. Ryan, Jr., Oxford, CT (US)

(73) Assignee: Pitney Bowes Inc., Stamford, CT (US)

(*) Notice: Subject to any disclaimer, the term of this patent is extended or adjusted under 35 U.S.C. 154(b) by 988 days.

This patent is subject to a terminal disclaimer.

(21) Appl. No.: 11/591,780

(22) Filed: Nov. 2, 2006

(65) Prior Publication Data

US 2007/0061275 A1 Mar. 15, 2007

Related U.S. Application Data

(63) Continuation of application No. 09/972,642, filed on Oct. 5, 2001, now Pat. No. 7,152,049.

(51) Int. Cl.
*G06F 17/00* (2006.01)

(52) U.S. Cl. ........ 705/401

(58) Field of Classification Search ........ 380/51
See application file for complete search history.

(56) References Cited

U.S. PATENT DOCUMENTS

| | | | | |
|---|---|---|---|---|
| 4,858,138 | A * | 8/1989 | Talmadge | 705/408 |
| 5,109,507 | A | 4/1992 | Check, Jr. | |
| 5,655,023 | A * | 8/1997 | Cordery et al. | 380/51 |
| 5,715,164 | A * | 2/1998 | Liechti et al. | 705/410 |
| 6,005,945 | A * | 12/1999 | Whitehouse | 380/51 |
| 6,058,384 | A * | 5/2000 | Pierce et al. | 705/50 |
| 6,061,671 | A | 5/2000 | Baker et al. | |
| 6,064,993 | A | 5/2000 | Ryan, Jr. | |
| 6,121,565 | A * | 9/2000 | Allott, III | 209/584 |
| 6,233,568 | B1 | 5/2001 | Kara | |
| 6,424,954 | B1 | 7/2002 | Leon | |
| 6,438,530 | B1 * | 8/2002 | Heiden et al. | 705/401 |
| 6,592,027 | B2 | 7/2003 | Kovlakas | |
| 6,687,684 | B1 * | 2/2004 | Whitehouse et al. | 705/408 |
| 6,895,395 | B1 * | 5/2005 | Blanluet et al. | 705/408 |

FOREIGN PATENT DOCUMENTS

| | | | |
|---|---|---|---|
| EP | 0718800 A1 | | 6/1996 |
| EP | 788076 A2 | | 1/1997 |
| WO | WO 01/48701 | * | 7/2001 |

OTHER PUBLICATIONS

"KARA Technology and DYMO-CoStar Partner to Bring Consumers Postage Stamps With the Ease of a Label Printer", Business Wire, Jun. 19, 2000.*
Arend, Mark "New Systems Tame Rising Postal Costs" (ABA Banking Journal, v84n11, p. 66-70, Nov. 1992).

* cited by examiner

*Primary Examiner* — Rutao Wu
(74) *Attorney, Agent, or Firm* — Brian A. Lemm; Charles R. Malandra, Jr.

(57) ABSTRACT

A method and system for a virtual stamp dispensing metering system is provided wherein indicia of varying values are calculated at a data center and downloaded to a mailing machine on a periodic basis. The mailing machine securely stores the indicia and dispenses the indicia as needed. At the end of the period, any unused indicia are returned to the data center, the user's account is credited, and a new set of indicia are downloaded to the mailing machine. Accordingly, the processing requirements of the meter are reduced, as there is no longer any need to generate digital signatures, an attacker is prevented from generating indicia indefinitely if the security of the meter is compromised, as the cryptographic key is not resident at the meter, and tracking requirements of the meter are reduced, as the meter alone can not be used to generate postage funds.

22 Claims, 4 Drawing Sheets

METHOD AND SYSTEM FOR DISPENSING VIRTUAL STAMPS

CROSS-REFERENCE TO RELATED APPLICATIONS

This application is a continuation application of prior application Ser. No. 09/972,642, filed Oct. 5, 2001, now U.S. Pat. No. 7,152,049.

FIELD OF THE INVENTION

The invention disclosed herein relates generally to systems for evidencing postage payment, and more particularly to a method and system for dispensing virtual stamps.

BACKGROUND OF THE INVENTION

Since the invention of the postage meter by Arthur H. Pitney, it has evolved from a completely mechanical postage meter to a meter that incorporates extensive use of electronic components. Postage metering systems have been developed which employ encrypted information that is printed on a mailpiece as part of an indicium evidencing postage payment. The encrypted information includes a postage value for the mailpiece combined with other postal data that relate to the mailpiece and the postage meter printing the indicium. The encrypted information, typically referred to as a digital token or a digital signature, authenticates and protects the integrity of information, including the postage value, imprinted on the mailpiece for later verification of postage payment. Since the digital token incorporates encrypted information relating to the evidencing of postage payment, altering the printed information in an indicium is detectable by standard verification procedures.

Presently, postage metering systems are recognized as either closed or open system devices. In a closed system device, the system functionality is solely dedicated to metering activity. Examples of closed system metering devices include conventional digital and analog postage meters wherein a dedicated printer is securely coupled to a metering or accounting function. In a closed system device, since the printer is securely coupled and dedicated to the meter, printing cannot take place without accounting. In an open system device, the printer is not dedicated to the metering activity. This frees the system functionality for multiple and diverse uses in addition to the metering activity. Examples of open system metering devices include personal computer (PC) based devices with single/multi-tasking operating systems, multi-user applications and digital printers. An open system metering device includes a non-dedicated printer that is not securely coupled to a secure accounting module. An open system indicium printed by the non-dedicated printer is made secure by including addressee information in the encrypted evidence of postage printed on the mailpiece for subsequent verification.

The United States Postal Service ("USPS") has approved personal computer (PC) postage metering systems as part of the USPS Information-Based Indicia Program ("IBIP"). The IBIP is a distributed trusted system which is a PC based metering system that is meant to augment existing postage meters using new evidence of postage payment known as information-based indicia. The program relies on digital signature techniques to produce for each mailpiece an indicium whose origin can be authenticated and content cannot be modified. The IBIP requires printing a large, high density, two-dimensional ("2-D") bar code on a mailpiece. The 2-D bar code, which encodes information, is signed with a digital signature. A published draft specification, entitled "IBIP PERFORMANCE CRITERIA FOR INFORMATION-BASED INDICIA AND SECURITY ARCHITECTURE FOR OPEN IBI POSTAGE METERING SYSTEMS (PCIBI-O)," dated Apr. 26, 1999, defines the proposed requirements for a new indicium that will be applied to mail being created using IBIP. This specification also defines the proposed requirements for a Postal Security Device ("PSD") and a host system element (personal computer) of the IBIP. A PSD is a secure processor-based accounting device that is coupled to a personal computer to dispense and account for postage value stored therein to support the creation of a new "information-based" postage postmark or indicium that will be applied to mail being processed using IBIP.

One version of an open metering system, referred to herein as a "virtual meter", includes a personal computer, referred to as the host PC, without a PSD coupled thereto. The host PC runs client metering applications, but all PSD functions are performed at a Data Center with which the host PC communicates via a network, such as, for example, a Local Area Network (LAN) or the Internet. The PSD functions at the Data Center may be performed in a secure device attached to a computer at the Data Center, or may be performed in the computer itself. The host PC must connect with the Data Center to process transactions such as postage dispensing, meter registration, or meter refills. Transactions are requested by the host PC and sent to the Data Center for remote processing. The transactions are processed centrally at the Data Center and the results are returned to the host PC. Accounting for funds and transaction processing are centralized at the Data Center. Thus, transactions are computed on an "as-needed" basis, and pre-computing any transactions is not performed. The virtual meter, however, does not conform to all the current requirements of the IBIP Specifications. In particular, the IBIP Specifications do not permit PSD functions to be performed at the Data Center.

In conventional closed system mechanical and electronic postage meters, a secure link is required between printing and accounting functions. For postage meters configured with printing and accounting functions performed in a single, secure box, the integrity of the secure box is monitored by periodic inspections of the meters. More recently, digital printing postage meters typically include a digital printer coupled to a PSD, and have removed the need for physical inspection by cryptographically securing the link between the accounting and printing mechanisms. In essence, new digital printing postage meters create a secure point-to-point communication link between the PSD and print head.

There are problems, however, with digital signature based postage metering systems. Such systems proposed by various Posts, such as the IBIP, place a premium on the protection of the cryptographic keys used to create the digital signatures. Any compromise of these keys would allow an attacker to produce indicia that is verifiable but for which no payment has actually been made. Thus, a sophisticated attacker could perpetrate a significant amount of fraud before being detected. Accordingly, these digital signature based postage metering systems require the meters to be physically secure against sophisticated attacks, such as, for example, physical penetration and differential power analysis, that could reveal the cryptographic keys. Complying with such requirements greatly increases the cost of the meters. Additionally, significant processing power is required to perform the cryptographic calculations within the meter, thereby further increasing the cost of the meter.

Another problem with the digital signature based postage metering systems is that the meter contains the cryptographic keys that are used to authenticate all transactions. A meter owner has no stake in protecting this information, and, in fact, a dishonest meter owner has every incentive to attempt to determine the keys stored in his meter, thereby allowing him to produce indicia without actually paying for them. Thus, the digital signature based postage metering systems place the most sensitive information in the least secure environment.

Although virtual meters overcome the problem of placing the cryptographic keys at the customer site by holding them in a data center, there are problems with this arrangement. Specifically, the customer must now be "on-line" to get postage, i.e., the customer must contact the data center to print postage. Additionally, postal requirements, such as the IBIP, require that the addressee information be sent to the data center to generate the indicium. This is inconvenient for the customer, and also has privacy implications relating to mailing lists.

SUMMARY OF THE INVENTION

The present invention alleviates the problems associated with the prior art and provides a method and system that incorporates the convenience of a closed system postage meter and the security of a virtual postage meter system.

In accordance with the present invention, a virtual stamp dispensing metering system is provided wherein indicia of varying values are calculated at a data center and downloaded to a mailing machine on a periodic basis. The mailing machine securely stores the indicia and dispenses the indicia as needed. At the end of the period, any unused indicia are returned to the data center, the user's account is credited, and a new set of indicia are downloaded to the mailing machine. Accordingly, the present invention reduces the processing requirements of the meter, as there is no longer any need to generate digital signatures. Additionally, the present invention prevents an attacker from generating indicia indefinitely if the security of the meter is compromised, as the cryptographic key is not resident at the meter, and the meter alone can not be used to generate postage funds.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PRESENT INVENTION

Figure 1:
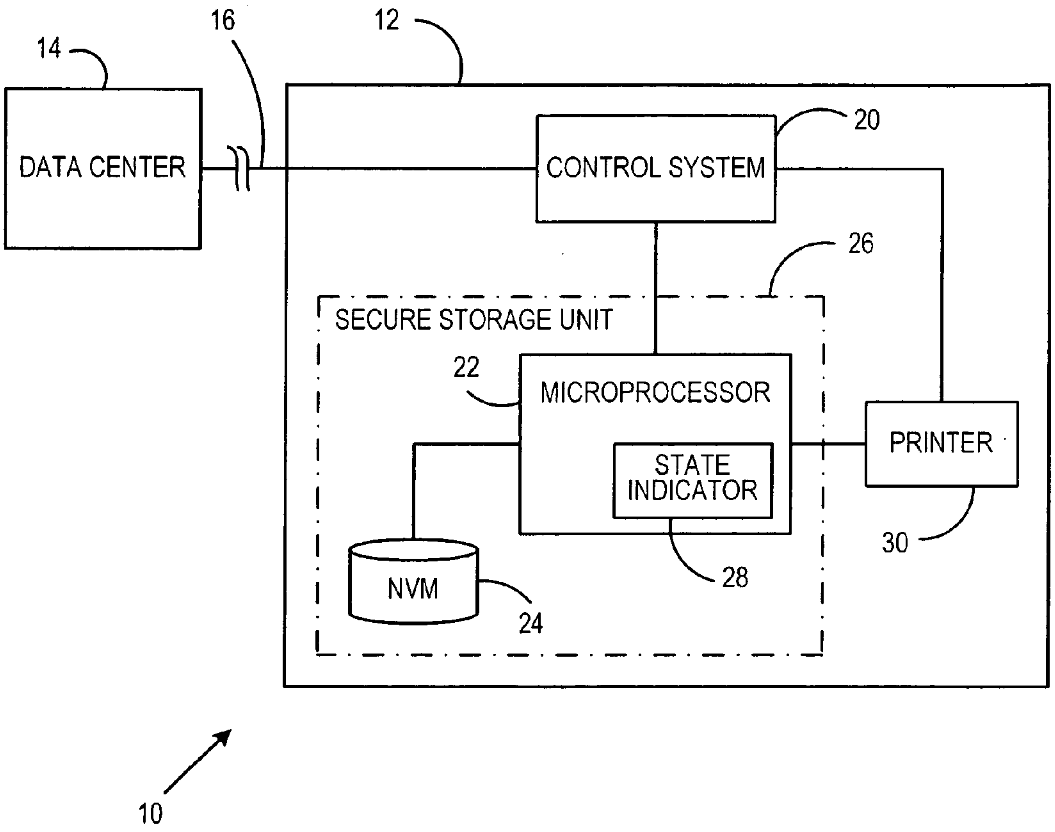
FIG. 1 illustrates in block diagram form a system according to the present invention.

In describing the present invention, reference is made to the drawings, wherein there is seen in FIG. 1 portions of a virtual stamp dispensing meter system 10 according to the present invention. A virtual stamp, as used herein, provides evidence of postage paid similar to a conventional adhesive stamp. The system 10 includes a meter 12 that communicates with a Data Center 14 via communication link 16. Communication link 16 could be, for example, a telephone connection via a Public Switched Telephone Network (PSTN) or a network connection via a Local Area Network (LAN) or the Internet. It should be noted that meter 12 could be either a stand alone postage meter, or alternatively integrated into a larger piece of equipment, such as, for example, a mailing machine.

Meter 12 includes a control system 20 that is responsible for coordinating the functions of meter 12, such as, for example, user interface, motion control, job setup, error handling and external communications. Meter 12 further includes a processor, such as, for example, microprocessor 22, that is associated with a non-volatile memory (NVM) 24. NVM 24 may be any type of memory or storage device whose contents are preserved when its power is off. The microprocessor 22 and NVM 24 function together to form a secure storage unit 26 where virtual stamps, i.e., indicium evidencing postage payment, are stored prior to use as will be described below. Alternatively, NVM 24 need not be part of secure storage unit 26. Microprocessor 22 is responsible for managing the data stored in NVM 24, as well as securing communications with data center 14. Microprocessor 22 also preferably includes a state indicator 28 that enables microprocessor 22 to determine if the data stored in the NVM 24 has changed, such as, for example, if an attempt has been made to reset the NVM 24 to an earlier state. State indicator 28 may be, for example, a non-volatile memory having two registers, one representing the total amount of unused indicia stored in NVM 24, and the other representing the total amount of used indicia stored in NVM 24. It should be noted that other schemes for state indicator 28 can also be used, so long as the state indicator 28 prevents against the replacement of NVM 24 that has dispensed indicia with an earlier copy of the NVM 24 that has not dispensed indicia. Meter 12 further includes a printer 30 for printing postage stored in NVM 24.

Figure 2:
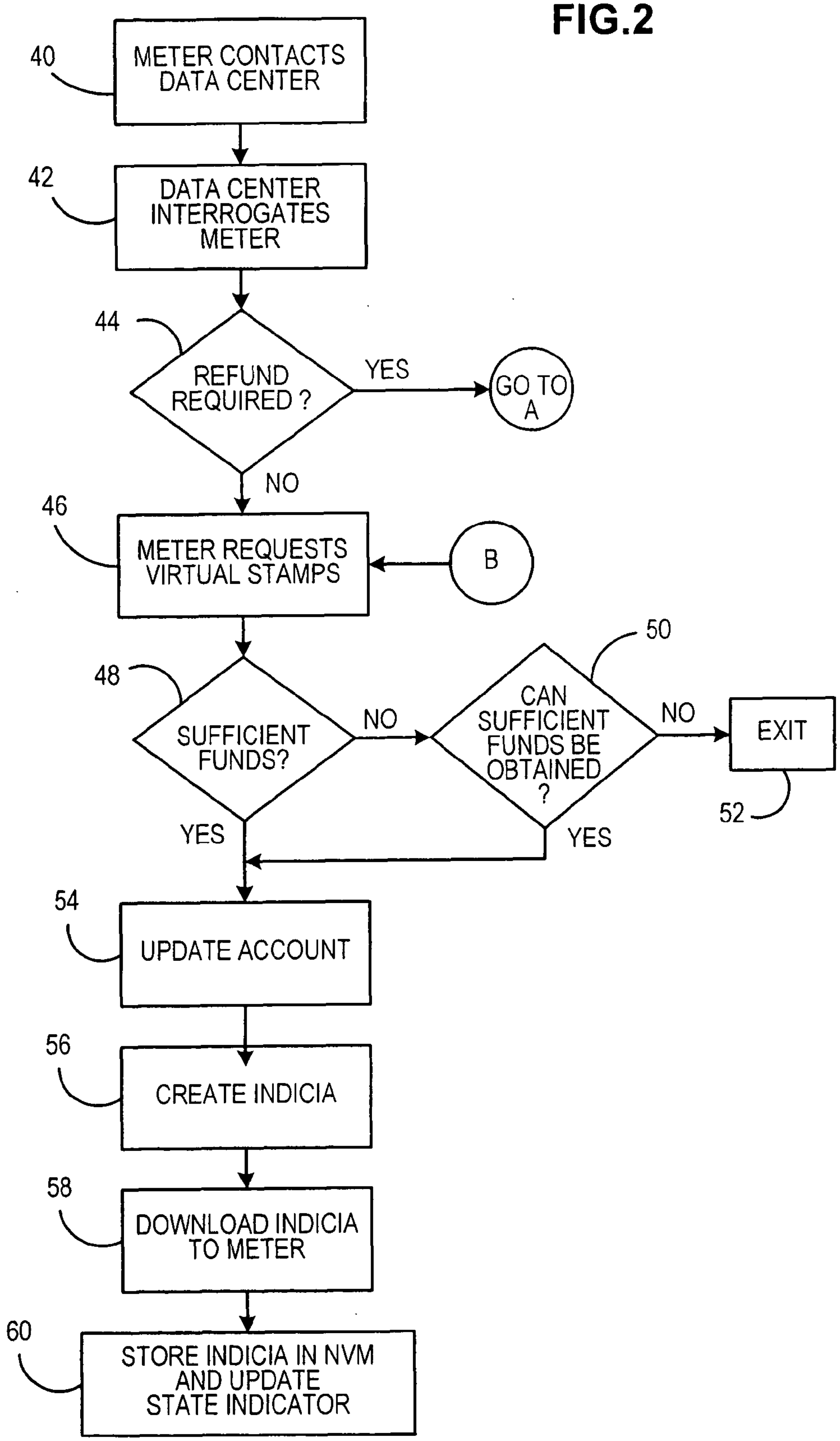
FIG. 2 illustrates in flow diagram form a process of purchasing and downloading a virtual stamp to a meter according to the present invention.

The operation of system 10 will now be described with respect to FIGS. 2-4. Referring now to FIG. 2, there is shown a process of purchasing and downloading virtual stamps, also referred to herein as indicium, to meter 12 according to the present invention. Preferably, virtual stamps are purchased and downloaded from data center 14 on a periodic or as needed basis. It should be noted, however, that while from a user or administrative perspective it would be simpler if postage were purchased on an as needed or as used basis, current postal regulations require that an indicium on a mailpiece bear the date that the mailpiece is deposited into the mail stream. Such regulations protect the image of the postal service by preventing the appearance of delayed delivery if the date in the indicium is significantly earlier than the deposit date. Accordingly, the purchasing of virtual stamps according to the present invention will be described as occurring on a daily basis. It should be understood, however, that the present invention is not so limited and the purchasing and downloading of new indicia and refunding of unused indicia can occur as desired.

When the purchase and downloading of virtual stamps is desired, in step 40 meter 12 contacts the data center 14 via communication link 16. Such contact can be either initiated automatically by the meter 12, automatically by the data center 14, or manually by a user of meter 12. Automatic initiation can be triggered, for example, by the time of day, day of the week, indicia stored within meter 12 falling below a predetermined threshold level, a request to dispense an amount of postage funds greater than the amount currently stored within meter 12, or any other trigger so desired. The communication is preferably specifically between microprocessor 22 and data center 14, and is preferably a secure communication utilizing a secure protocol, such as, for example, Secure Socket Layer (SSL) protocol. Optionally, in step 42, the data center 14 can interrogate the meter 12 to determine that the meter 12 is functioning properly, such as, for example, by performing diagnostic tests. In step 44, it is determined if a refund is required. A refund is required if NVM 24 of meter 12 has any unused indicia that have expired, e.g., indicia whose date is earlier than the present date. If in step 44 it is determined a refund is required, then the process according to the present invention will process the refund as described below with respect to FIG. 4.

Once the refund has been processed, if necessary, or if in step 44 it is determined that a refund is not required, then in step 46 meter 12 requests a purchase and download of virtual stamps. The request may be, for example, a specific request, i.e., a request for one hundred first class rate stamps (currently $0.34), twenty postcard rate stamps (currently $0.21), etc. It should be understood that the above are examples only, and a specific request can be for any number of any rate indicia. Alternatively, the request can be, for example, a request to replenish all virtual stamps dispensed by meter 12 since the previous purchase request. The request can also be, for example, a request for the data center 14 to provide virtual stamps based upon an existing agreement that specifies the number and type of indicia to be purchased each time a request is made. The request can also be, for example, a request to replenish the meter based on past usage patterns of meter 12. For example, data center 12 could store usage patterns for meter 12 and determine time periods, such as, for example, the end of the month, when usage of meter 12 is heavier and provide additional indicia during that time period.

In step 48, data center 12 determines if there are sufficient funds in the user account for meter 12 to pay for the indicia requested in step 46. For example, the user of meter 12 can maintain a deposit account, a credit line, have a credit card number on file, or provide account debit authorization for data center 14 to pay for indicia. If in step 48 it is determined that sufficient funds are not currently available, then in step 50 it is determined if sufficient funds can be obtained, such as, for example, by prompting the user to provide a credit card number or the like. If sufficient funds can not be obtained in step 50, then in step 52 the process exits and no new indicia can be purchased and downloaded to meter 12. If sufficient funds can be obtained in step 50, or if in step 48 it is determined that sufficient funds are currently available, then in step 54 the user's account will be updated to reflect the purchase of the requested indicia and debit that account accordingly.

In step 56, data center 14 creates the indicia requested by meter 12. The indicia may be created in compliance with the IBIP standard for a closed meter system, or any other applicable indicium standard or postage evidencing method. Since the indicia are created by the data center 14, the cryptographic keys used to generate the indica can be maintained by the data center 14 and need not be contained within the meter 12. Accordingly, the meter 12 according to the present invention is less expensive to produce than conventional closed system meters, as the security required for the protection of the keys and the processing power necessary to perform the cryptographic computations do not need to be provided in meter 12. The date of mailing included in each created indicium could be either the present date or the next day's date if the indicia are created after normal business hours are over. Alternatively, the indicia could be distributed over a range of dates, e.g., one week, which would reduce the frequency with which the meter 12 must contact the data center 14. To comply with current postal regulations, however, the mailpiece upon which the indicium is printed must be deposited on the date included in the indicium. Alternatively, if postal regulations permit, the date in the barcode portion of the indicium could be the date that the indicium was created at the data center 14, while the human readable date (added when the indicium is dispensed and printed) could be the date of deposit. This would preserve the image of the postal service and reduce the need to refund any unused indicia, as it could be used on any date. Additionally, this allows indicia to be generated and stored on a medium, such as for example, a smart card or credit card, that can be purchased by a user and then downloaded to a meter, thus removing the need for a communication between the data center and the meter.

In step 58, the indicia created by the data center 14 in step 56 are downloaded to meter 12 via communication link 16. In step 60, meter 12 stores the indicia received from data center 14, preferably in an encrypted form, in NVM 24. Memory space in NVM 24 may be conserved by overwriting indicia flagged as refunded (as described below with respect to FIG. 4). Additionally, all of NVM 24 may be overwritten at this time to contain only unused indicia. Also in step 60, the state indicator 28 is updated to reflect the current transaction. Thus, for example, the register representing the total amount of unused postage stored in NVM 24 will be updated to reflect the additional postage downloaded from data center 14.

Table 1 below illustrates one method for storing the indicia downloaded from data center 14 in NVM 24. The expiration date indicates the last day on which the indicium may be issued, i.e., dispensed and printed. As noted above, current postal regulations require that an indicium only be valid for one day. The present invention is not so limited, however, and an indicium could be valid for a larger range of dates.

TABLE 1

| Index | Postage Amount | Expiration Date | Status | Encrypted Indicium Data | MAC |
|---|---|---|---|---|---|
| 1 | $0.21 | Sept. 28, 2001 | Issued | *************************** | 1234567890ABCDEF |
| 2 | $0.21 | Sept. 28, 2001 | Unused | *************************** | 234567890ABCDEF1 |
| 3 | $0.34 | Sept. 28, 2001 | Issued | *************************** | 34567890ABCDEF12 |
| 4 | $0.34 | Sept. 28, 2001 | Issued | *************************** | 4567890ABCDEF123 |
| 5 | $0.34 | Sept. 28, 2001 | Issued | *************************** | 567890ABCDEF1234 |
| 6 | $0.34 | Sept. 28, 2001 | Unused | *************************** | 67890ABCDEF12345 |

A status for each indicium, i.e., Issued or Unused, is maintained to indicate whether or not an indicium has been issued. Alternatively, the status may be maintained by deleting indicia as they are issued. Additional status levels, as further described below, can also be provided. The indicium barcode data is stored in an encrypted form to protect against an attacker simply reading data out of the NVM 24 and using a standard printer to print indicia. Each record also includes a Message Authentication Code (MAC), or, alternatively, a digital signature, of all of the other elements in the record to allow the microprocessor 22 to determine if any of the records have been modified. A pointer for the first record for each postage amount (e.g., Index 1 for $0.21 and Index 3 for $0.34 of Table 1) or a pointer to the first unused record for each postage amount (e.g., Index 2 for $0.21 and Index 6 for $0.34 of Table 1) can be maintained in a separate area of NVM 24 or in microprocessor 22.

Figure 3:
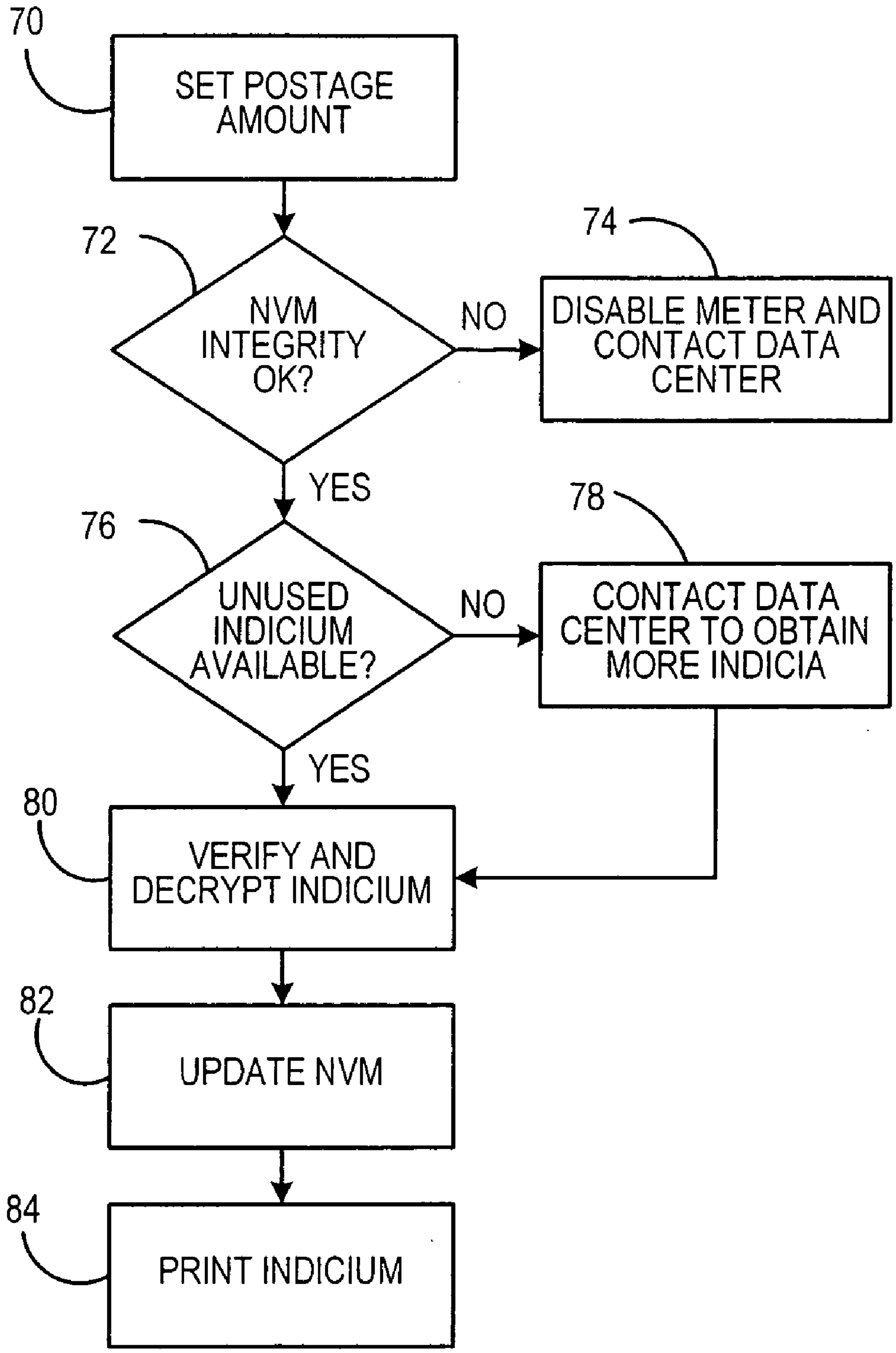
FIG. 3 illustrates in flow diagram form a process for printing postage according to the present invention.

Referring now to FIG. 3, there is shown a process for printing indicia stored in NVM 24 of meter 12 according to the present invention. Unlike conventional virtual meter systems, the meter 12 according to the present invention does not need to contact the data center 14 each time postage is to be dispensed and printed. In step 70, the postage amount desired to be dispensed and printed is set. This may be done manually by the user or automatically by an integrated scale and rating engine within a mailing machine that includes the meter 12. In step 72, microprocessor 22 checks the integrity of the NVM 24 by verifying that the state of the NVM 24 agrees with the state indicator 28 of microprocessor 22. For example, if a two register state indicator is used, the integrity check would be performed by summing the total of issued and unused indicia stored in the NVM 24 and comparing the results with the two registers of the state indicator 28. Additional checks on the NVM 24 may also be conducted at this time. If a discrepancy between the state indicator 28 and the state of the NVM 24 is found, then in step 74 the meter 12 is disabled and the data center 14 is automatically contacted, if possible, to alert data center 14 of possible fraudulent use of meter 12.

If in step 72 it is determined that the integrity of NVM 24 is acceptable, then in step 76 microprocessor 22 determines if there is at least one unused indicium available for the requested postage amount. If it is determined that there is not at least one unused indicium available in the requested postage amount, then in step 78 meter 12 will contact data center 14 to obtain more indicia as previously described with respect to FIG. 2. After more indicia have been obtained in step 78, or if in step 76 it is determined that an unused indicium is available, then in step 80 microprocessor 22 will verify the integrity of the unused record, by verifying the digital signature (MAC,) and decrypt the Encrypted Indicium Data for the unused record. In step 82, microprocessor 22 will update the index record to change the status from "Unused" to "Issued," create a new MAC for the indicium record and update the state indicator 28 accordingly. In step 84, the decrypted indicium data is sent to the printer 30 for printing on a medium, such as, for example, an envelope or label. Formatting of the indicium image may be done at microprocessor 22 or printer 30. Preferably, the link between the microprocessor 22 and printer 30 is a secure link, similar to closed system meters.

Optionally, in step 82, microprocessor 22 will update the index record from an "Unused" status to an "In-Process" status. The status of the index record will not be updated to "Issued" until microprocessor 22 can verify that printing of the indicium in step 84 has been completed. This would allow an indicium to be reprinted should an error occur during the printing process. A record of reprints could be kept and sent to the data center 14 or processed by microprocessor 22 to determine if a user is attempting to commit fraud by excessive reprinting of indicia.

Figure 4:
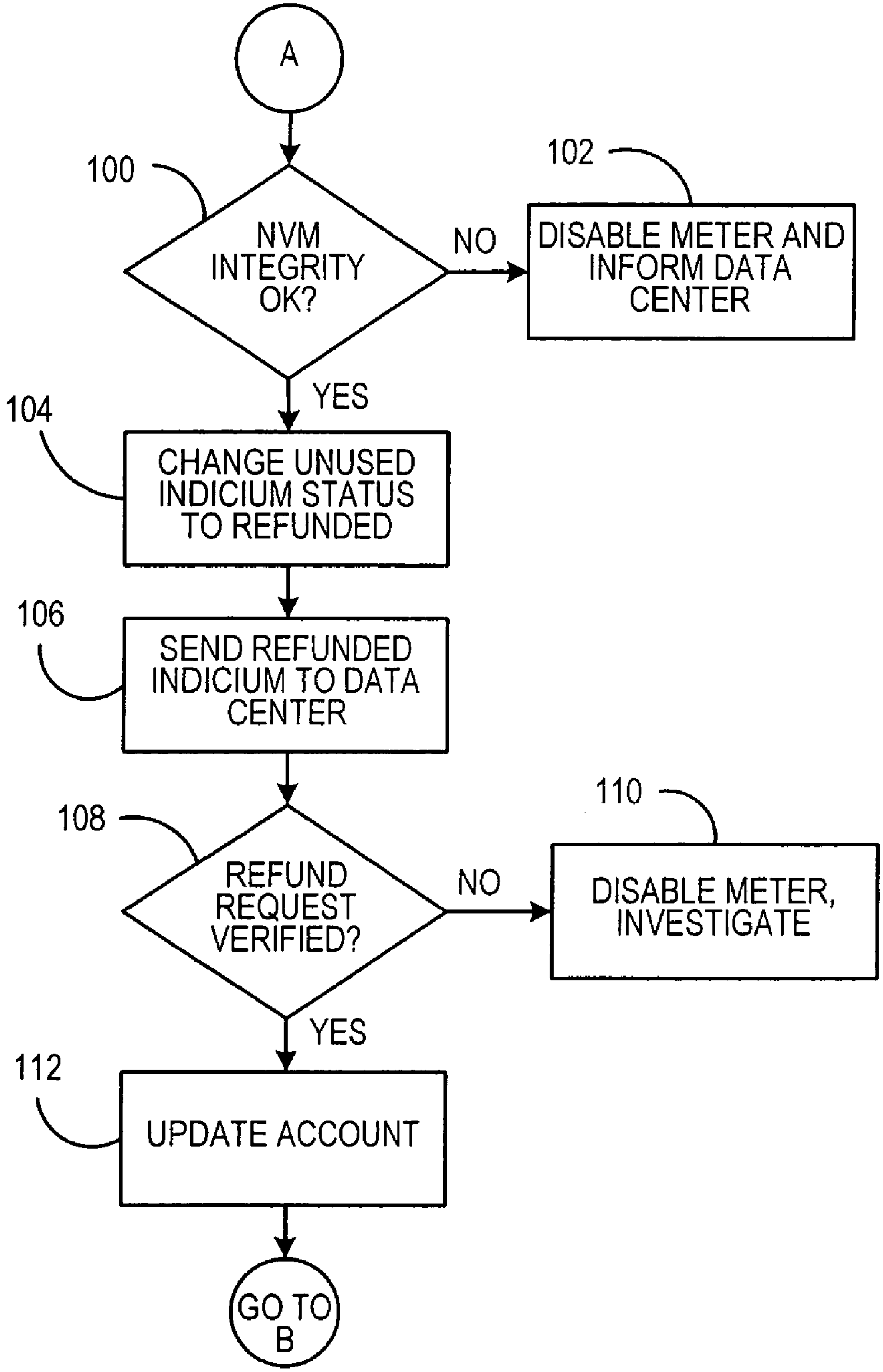
FIG. 4 illustrates in flow diagram form a process for refunding unused postage according to the present invention.

Referring now to FIG. 4, there is shown a process for refunding unused postage according to the present invention. If it is determined in step 44 of FIG. 1 that a refund is required, then in step 100 of FIG. 4 microprocessor 22 will verify the integrity of NVM 24 by verifying that the state of the NVM 24 agrees with the state indicator 28 of microprocessor 22. For example, if a two register state indicator is used, the integrity check would be performed by summing the total of issued and unused indicia stored in the NVM 24 and comparing the results with the two registers of the state indicator 28. Additional checks on the NVM 24 may also be conducted at this time. If a discrepancy between the state indicator 28 and the state of the NVM 24 is found, then in step 102 the meter 12 is disabled and the data center 14 is automatically contacted, if possible, to alert data center 14 of possible fraudulent use of meter 12.

If in step 100 it is determined that the integrity of NVM 24 is acceptable, then in step 104 microprocessor 22 will change the status of all unused indicia from "Unused" to "Refunded" and update the MAC for each record. In step 106 the refunded indicia are sent to the data center 14 along with a refund request. Alternatively, a refund request from microprocessor 22 could simply be a signed message indicating the amount of the requested refund. While this would simplify the refund process, as accounting for each individual indicium being returned is no longer necessary, it requires more trust in and security for microprocessor 22, since it will not be known which individual indicia are being refunded.

In step 108, data center 12 determines if the refund request is verified. This includes verifying the digital signature of each of the indicium records being refunded and may also include, for example, verifying the integrity of each record, checking with the postal service to ensure that none of the indicium for which a refund is being requested has already been processed by the postal service, informing the postal service of the indicia for which a refund is being requested, thereby allowing the postal service to recognize any of the indicia as fraudulent should they subsequently appear on mailpiece, or checking a past history of refunds by a particular user to identify any changes in refund patterns. If in step 108 the refund request is not verified, then in step 110 the meter 12 is disabled and an investigation of meter 12 is triggered. If in step 108 it is determined that the refund request is verified, then in step 112 the user's account is credited to reflect the refund of indicia.

Alternatively, in step 112, the indicia that is being refunded could be recreated with a different date. This would eliminate the need to credit the user's account, and would maintain a closer tie between the ascending register and descending register values printed as part of the 2D barcode in the indicium and the user's account.

After the user's account has been updated to reflect the refund of the indicia or the indicia have been recreated with a different date, the processing returns to step 46 of FIG. 2.

Thus, according to the present invention, a method and system for a virtual stamp dispensing metering system is provided that incorporates the convenience of a closed system postage meter and the security of a virtual postage meter system. According to the present invention, indicia of varying values are calculated at a data center and downloaded to a mailing machine on a periodic basis. The mailing machine securely stores the indicia and dispenses the indicia as needed. At the end of the period, any unused indicia are returned to the data center, the user's account is credited, and a new set of indicia are downloaded to the mailing machine. Thus, the system and method of the present invention reduce the processing requirements of the meter, as there is no longer any need to generate digital signatures, prevent an attacker from generating indicia indefinitely if the security of the meter is compromised, as the cryptographic key is not resident at the meter, and reduce the tracking requirements of the meter, as the meter can not be used to "create" postage funds.

It should be understood that although the present invention was described with respect to a postage metering system, the present invention is not so limited and is applicable to any type of value metering system. While a preferred embodiment of the invention has been described and illustrated above, it should be understood that this is exemplary of the invention and is not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for providing virtual stamps to a storage device for use in evidencing payment of postage, said virtual stamps used to evidence payment of postage for any mail piece, said method comprising:

establishing a communication between a data center and said storage device;

determining that a refund of any unused virtual stamps previously stored in said storage device is required and processing said refund;

receiving, at said data center, a request for a plurality of virtual stamps, at least two of said plurality of virtual stamps for a specified rate;

determining, at said data center, that sufficient funds are available to pay for said requested plurality of virtual stamps;

generating said plurality of virtual stamps at said data center;

downloading said plurality of virtual stamps to said storage device via said communication;

storing said plurality of virtual stamps along with information associated with each of said plurality of virtual stamps in said storage device, said associated information for each virtual stamp including an index number, an amount, an expiration date, and a status; and updating a state indicator in said storage device to include said plurality of stored virtual stamps.

2. The method according to claim 1, further comprising:

determining, by said data center, that said storage device is operating properly.

3. The method according to claim 1, wherein determining that a refund is required further comprises:

verifying a status of said storage device;

changing a status of an unused virtual stamp to be refunded;

sending a refund request to said data center;

verifying said refund request; and processing said refund request.

4. The method according to claim 3, wherein verifying a status of said storage device further comprises:

comparing data stored in said storage device with data in said state indicator of said storage device; and disabling said storage device when said data stored in said storage device is different than said data of said state indicator.

5. The method according to claim 3, wherein changing a status further comprises:

changing said status of said unused virtual stamp from an unused status to a refunded status.

6. The method according to claim 3, wherein sending a refund request further comprises:

sending a message indicating an amount of said refund request without including said unused virtual stamp.

7. The method according to claim 3, wherein sending a refund request further comprises:

sending said unused virtual stamp with said refund request.

8. The method according to claim 7, wherein verifying said refund request further comprises:

verifying a digital signature of said unused virtual stamp being refunded.

9. The method according to claim 3, wherein processing said refund request further comprises:

updating an account associated with said storage device to reflect said refund.

10. The method according to claim 3, wherein processing said refund request further comprises:

recreating said refunded virtual stamp with a different date.

11. The method according to claim 1, further comprising storing a digital signature for said associated information in said storage device.

12. The method according to claim 1, wherein generating said plurality of virtual stamps further comprises:

utilizing a predetermined key to generate said plurality of virtual stamps, said predetermined key not being resident at said storage device.

13. The method according to claim 1, further comprising:

printing a selected one of said plurality of virtual stamps stored in said storage device on a medium without contacting said data center;

updating a status of said selected one of said plurality of virtual stamps to reflect said printing; and updating said state indicator to reflect said printing of said selected one of said plurality of virtual stamps.

14. The method according to claim 13, wherein printing a selected one of said plurality virtual stamps further comprises:

verifying said selected one of said plurality of virtual stamps; and decrypting said selected one of said plurality of virtual stamps.

15. The method according to claim 13, wherein updating a status further comprises:

updating said status from a first status to a second status associated with said printing;

verifying that said printing has been completed; and updating said status from said second status to a third status when said printing is completed.

16. The method according to claim 15, wherein when said printing does not complete, said method further comprises:

reprinting said selected one of said plurality of virtual stamps.

17. The method according to claim 1, wherein requesting a plurality of virtual stamps further comprises:

requesting at least one virtual stamp to replace a virtual stamp previously dispensed by said storage device.

18. The method according to claim 1, wherein requesting a plurality of virtual stamps further comprises:

requesting a plurality of virtual stamps based on a predetermined agreement.

19. The method according to claim 1, wherein requesting a plurality of virtual stamps further comprises:

requesting virtual stamps based on previous usage patterns of said storage device.

20. The method according to claim 1, wherein each of said plurality of virtual stamps includes a mailing date and generating said plurality of virtual stamps further comprises:

generating a plurality of virtual stamps having a range of mailing dates.

21. The method according to claim 1, wherein generating said plurality of virtual stamps further comprises:

including a creation date in each of said plurality of virtual stamps.

22. The method according to claim 21, further comprising:

printing a selected one of said plurality of virtual stamps and a deposit date on a medium, said deposit date being subsequent to said creation date for said selected one of said plurality of virtual stamps.

* * * * *